US012619421B2

(12) United States Patent
Oh et al.

(10) Patent No.: US 12,619,421 B2
(45) Date of Patent: May 5, 2026

(54) METHOD FOR UPDATING APPLICATION AND ELECTRONIC DEVICE THEREOF

(71) Applicant: Samsung Electronics Co., Ltd., Suwon-si (KR)

(72) Inventors: Myeongjin Oh, Suwon-si (KR); Moonkyung Kim, Suwon-si (KR); Cheoljun Park, Suwon-si (KR); Dongwook Seo, Suwon-si (KR); Seyeong Lee, Suwon-si (KR); Yongi Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 18/507,562

(22) Filed: Nov. 13, 2023

(65) Prior Publication Data

US 2024/0118887 A1 Apr. 11, 2024

Related U.S. Application Data

(63) Continuation of application No. PCT/KR2023/015188, filed on Oct. 4, 2023.

(30) Foreign Application Priority Data

Oct. 5, 2022 (KR) ........................ 10-2022-0127364
Oct. 21, 2022 (KR) ........................ 10-2022-0136781

(51) Int. Cl.
*G06F 8/65* (2018.01)

(52) U.S. Cl.
CPC ...................................... *G06F 8/65* (2013.01)

(58) Field of Classification Search
CPC ................................................. G06F 8/61–71
See application file for complete search history.

(56) References Cited

U.S. PATENT DOCUMENTS 10,044,757 B2 8/2018 Qureshi et al.
2010/0262958 A1 10/2010 Clinton et al.
(Continued)

FOREIGN PATENT DOCUMENTS

CN 110286920 A 9/2019
CN 110244963 B 5/2020
(Continued)

OTHER PUBLICATIONS

International Search Report with Written Opinion and English translation dated Jan. 11, 2024; International Appln. No. PCT/KR2023/015188.

(Continued)

*Primary Examiner* — Duy Khuong T Nguyen
(74) *Attorney, Agent, or Firm* — Jefferson IP Law, LLP

(57) ABSTRACT

An electronic device is provided. The electronic device includes a communication module, a memory, and a processor operatively connected with the communication module and the memory, wherein the memory stores instructions which, when executed, cause the processor to, based on application information of a specific application installed in the electronic device, receive app store source change information for updating the specific application, identify whether a higher version of the specific application exists in an app store which is to update the specific application, the app store being identified based on the app store source change information relating to the specific application, and update the specific application by receiving an application package of the higher version from the identified app store.

20 Claims, 10 Drawing Sheets

(56) References Cited

U.S. PATENT DOCUMENTS

| | | |
|---|---|---|
| 2011/0244830 A1 | 10/2011 | Chesnutt et al. |
| 2013/0019233 A1 | 1/2013 | Pardehpoosh et al. |
| 2014/0304683 A1 | 10/2014 | Kim et al. |
| 2014/0379925 A1 | 12/2014 | Kang et al. |
| 2015/0006328 A1* | 1/2015 | Yoon .................. G06Q 30/0629 |
| | | 705/26.62 |
| 2016/0124743 A1 | 5/2016 | Winterton |
| 2016/0266885 A1* | 9/2016 | Aleksandrov ............. G06F 8/65 |
| 2017/0060567 A1 | 3/2017 | Kim et al. |
| 2022/0229645 A1 | 7/2022 | Yoo et al. |

FOREIGN PATENT DOCUMENTS

| | | |
|---|---|---|
| EP | 1 826 982 A1 | 8/2007 |
| JP | 6437589 B2 | 12/2018 |
| KR | 10-2014-0148302 A | 12/2014 |
| KR | 10-2016-0004354 A | 1/2016 |
| KR | 10-2017-0025085 A | 3/2017 |
| KR | 10-2017-0071799 A | 6/2017 |
| KR | 10-2124330 B1 | 6/2020 |
| KR | 10-2022-0021667 A | 2/2022 |
| WO | 2013/063791 A1 | 5/2013 |
| WO | 2013/119076 A1 | 8/2013 |

OTHER PUBLICATIONS

European Search Report dated Jul. 25, 2025, issued in European Application No. 23875187.9.
European Communication pursuant to Article 94(3) EPC dated Mar. 13, 2026; European Application No. 23 875 187.9-1207.

* cited by examiner

FIG. 3

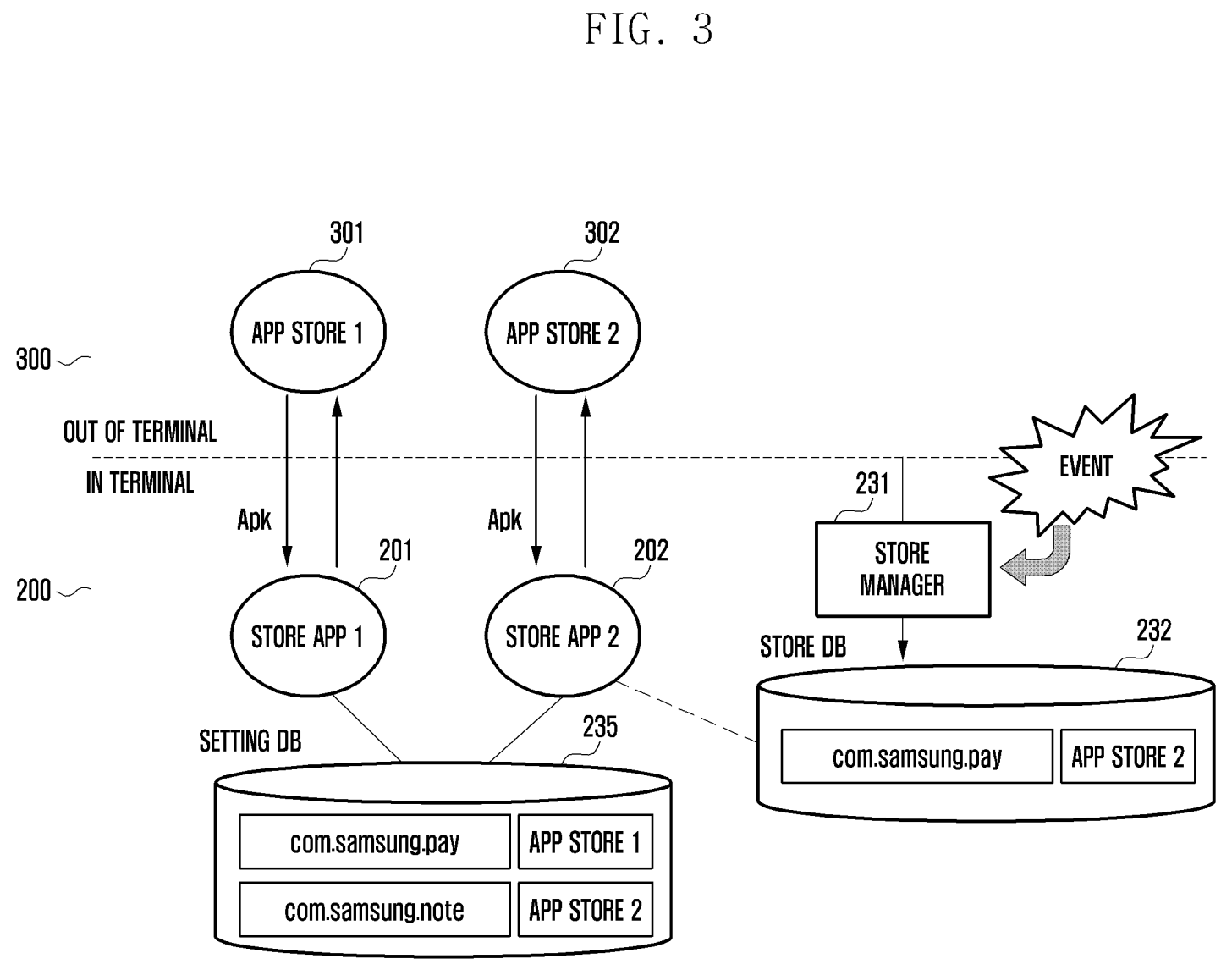

EVENT

231 STORE MANAGER

232 STORE DB
com.samsung.pay
APP STORE 2

302 APP STORE 2
202 STORE APP 2
Apk

301 APP STORE 1
201 STORE APP 1
Apk

300

OUT OF TERMINAL
IN TERMINAL

200

235 SETTING DB
com.samsung.pay | APP STORE 1
com.samsung.note | APP STORE 2

```
<CONFIG>
   <COUNTRY value="KOR"/>
   <CARRIERS value="ALL"/>
   <VERSION value="12"/>  //ANDROID 12 OS OR HIGHER
   <SOURCE value="com.sec.android.app.samsungapp"/>
</CONFIG>
<APPLICATIONS>
   <PACKAGE name="com.samsung.A"/>
        <CERTIFICATION value="2e232821220838c6201eecdfee5of037aa9c15c1"/>
        <SIGNATURE value="69e7bcf72c5fadf2b2aaf2336eba224ac838f130b2a8af71aea8d19ca7ea1630"/>
        <VERSION value="1.4.2"/>
   </PACKAGE>
   <PACKAGE name="com.samsung.B"/>
        <CERTIFICATION value="5d958be06c77fae8e191ce59543556447cb26d7d"/>
        <SIGNATURE value="4ac838f130b69e7baaf2336eba228af71069e7baaf2336ebaea8d19cba224ac"/>
        <VERSION value="5.1.2"/>
   </PACKAGE>
<APPLICATIONS>
```

FIG. 9

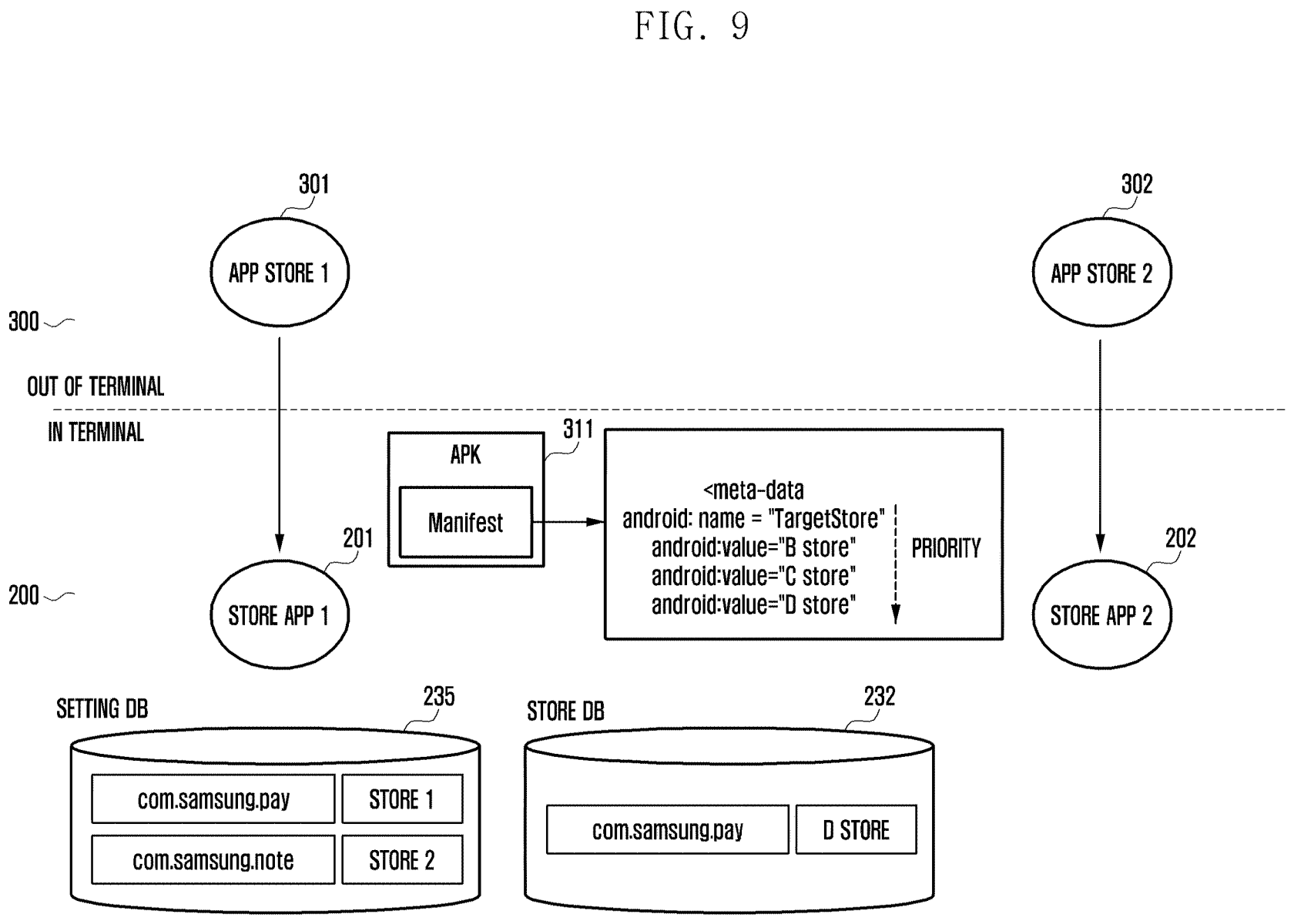

300 — OUT OF TERMINAL

APP STORE 1  301

APP STORE 2  302

IN TERMINAL

APK

Manifest  311

<meta-data
android: name = "TargetStore"
android:value="B store"
android:value="C store"
android:value="D store"

PRIORITY

STORE APP 1  201

STORE APP 2  202

200 —

SETTING DB  235

| com.samsung.pay | STORE 1 |
| com.samsung.note | STORE 2 |

STORE DB  232

| com.samsung.pay | D STORE |

METHOD FOR UPDATING APPLICATION AND ELECTRONIC DEVICE THEREOF

CROSS-REFERENCE TO RELATED APPLICATION(S)

This application is a continuation application, claiming priority under § 365(c), of an International application No. PCT/KR2023/015188, filed on Oct. 4, 2023, which is based on and claims the benefit of a Korean patent application number 10-2022-0127364, filed on Oct. 5, 2022, in the Korean Intellectual Property Office, and of a Korean patent application number 10-2022-0136781, filed on Oct. 21, 2022, in the Korean Intellectual Property Office, the disclosure of each of which is incorporated by reference herein in its entirety.

TECHNICAL FIELD

The disclosure relates to a method for updating an application and an electronic device thereof.

BACKGROUND ART

An electronic device may include an operating system (OS) for controlling one or more resources and an application executable in the operating system.

The electronic device may perform an application update with respect to an application installed in the electronic device through various application stores (hereinafter, referred to as an "app store") (e.g., Play Store™) operated by a server. The electronic device may download an application package (e.g., an installation file (e.g., *.apk file)) from an app store to update an application.

The above information is presented as background information only to assist with an understanding of the disclosure. No determination has been made, and no assertion is made, as to whether any of the above might be applicable as prior art with regard to the disclosure.

DISCLOSURE OF INVENTION

When updating an application, an electronic device may perform an update by downloading an application package through an app store through which the application has been installed. However, in various situations, there may be a need to perform an update by downloading an application package through another app store other than the app store through which the application has been installed.

Aspects of the disclosure are to address at least the above-mentioned problems and/or disadvantages and to provide at least the advantages described below. Accordingly, an aspect of the disclosure is to provide a method for updating an application by changing an app store by an electronic device, and the electronic device thereof.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a memory, and at least one processor operatively connected with the communication module and the memory, wherein the memory stores instructions which, when executed, cause the at least one processor to, based on application information of a specific application installed in the electronic device, receive app store source change information for updating the specific application, identify whether a higher version of the specific application exists in an app store which is to update the specific application, the app store being identified based on the app store source change information relating to the specific application, and update the specific application by receiving an application package of the higher version from the identified app store.

In accordance with another aspect of the disclosure, a method of an electronic device is provided. The method includes based on application information of a specific application installed in the electronic device, receiving app store source change information for updating the specific application, identifying whether a higher version of the specific application exists in an app store which is to update the specific application, the app store being identified based on the app store source change information relating to the specific application, and updating the specific application by receiving an application package of the higher version from the identified app store.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 3 is a diagram illustrating an operation of an electronic device for performing an application update according to an embodiment of the disclosure;

FIG. 6 is a diagram illustrating an operation of an electronic device for performing an application update according to an embodiment of the disclosure;

FIG. 7 illustrates a specification file for changing an update app store according to an embodiment of the disclosure;

FIG. 9 is a diagram illustrating an operation of an electronic device for performing an application update according to an embodiment of the disclosure.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
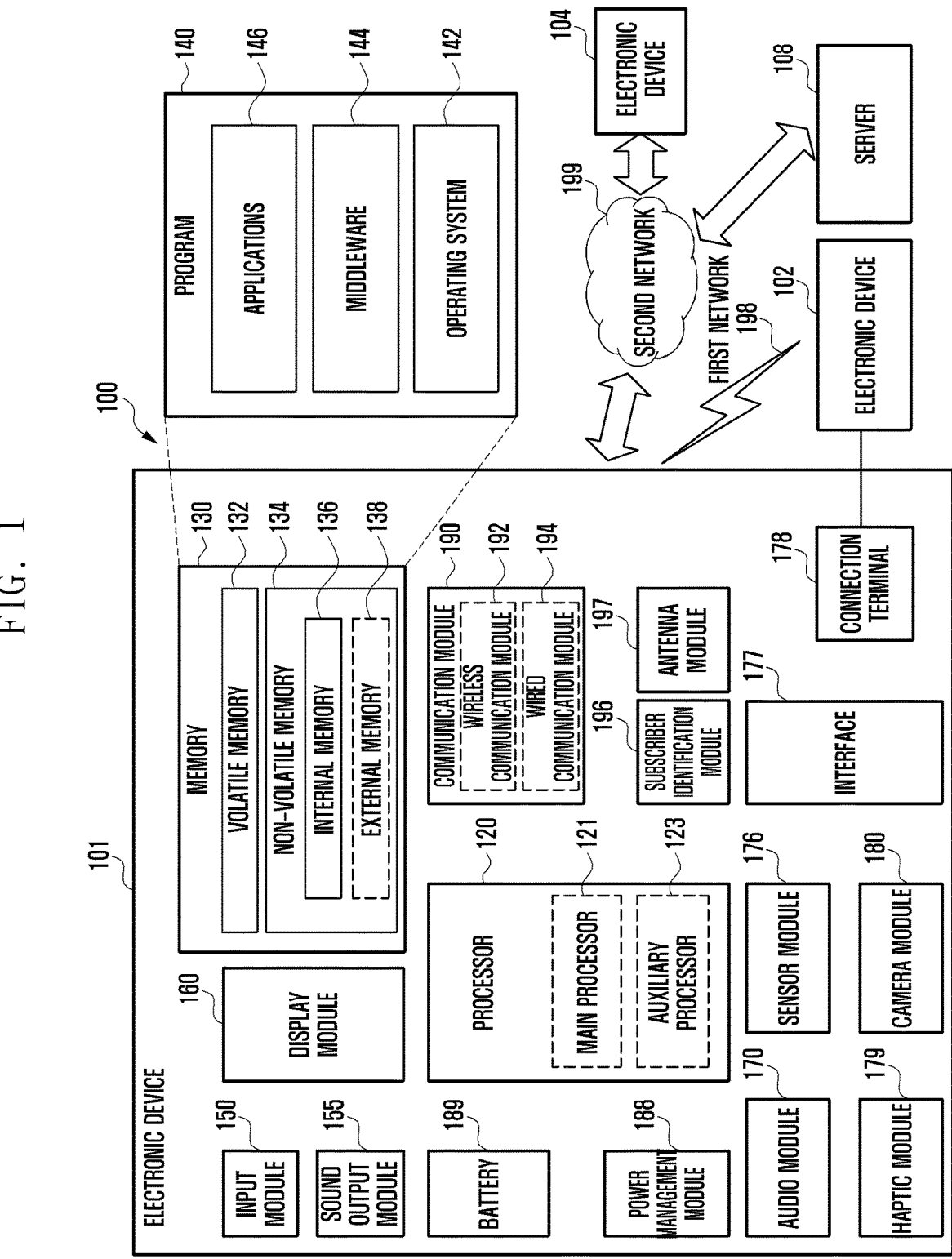
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more)

for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
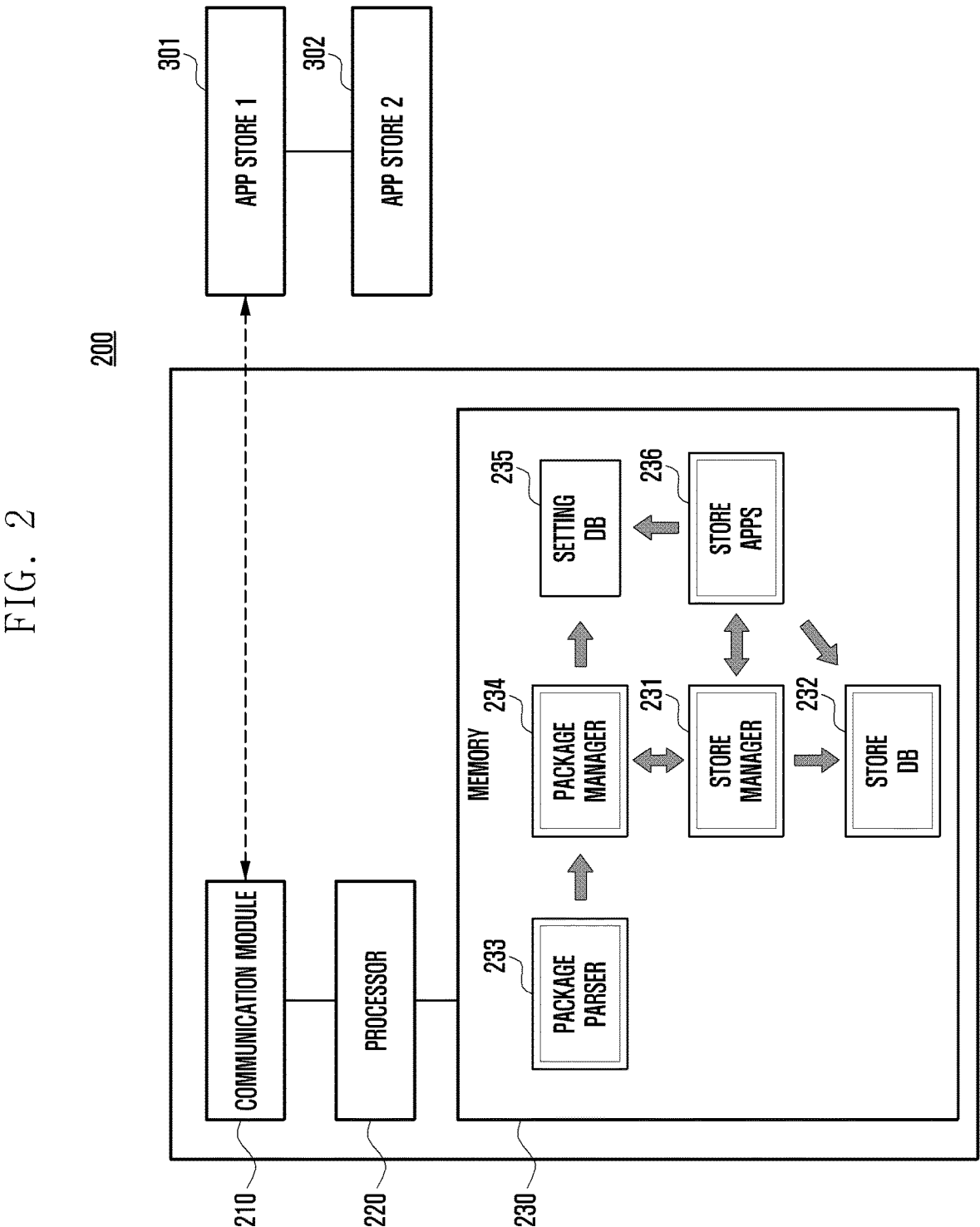
FIG. 2 is a block diagram of an electronic device according to an embodiment of the disclosure.

FIG. 2 is a block diagram illustrating an electronic device for performing an application update according to an embodiment of the disclosure.

Referring to FIG. 2, an electronic device 200 may include a communication module 210 (e.g., the communication module 190 of FIG. 1), a processor 220 (e.g., the processor 120 of FIG. 1), and a memory 230 (e.g., the memory 130 of FIG. 1). The components illustrated in FIG. 2 are merely examples, and some of the components may be omitted, replaced, or integrated as one module according to various embodiments. Among the components illustrated in FIG. 2, a detailed description overlapping with the description of the components described with reference to FIG. 1 may be omitted.

According to various embodiments of the disclosure, the communication module 210 may support establishing a direct (e.g., wired) communication channel or a wireless communication channel between the electronic device 200 and a plurality of app stores (a first app store 301 and a second app store 302) (e.g., the server 108 of FIG. 1) and performing communication via the established communication channel.

According to an embodiment of the disclosure, the communication module 210 may include a wireless communication module (e.g., the wireless communication module 194 of FIG. 1), and transmit or receive various signals and/or data for an application update by communicating with external app stores via a network (e.g., the second network 199 (e.g., a telecommunications network, such as a legacy cellular network, a 5G network, a next generation communication network, the Internet, or a computer network (e.g., a LAN or a WAN))).

According to various embodiments of the disclosure, the memory 230 may include functional modules which execute (or process) functions related to updating an application of the electronic device 200.

In various embodiments of the disclosure, the functional modules may be included, as hardware modules or software modules, in at least one processor 220 including processing circuitry. The case where the functional modules according to the embodiment shown in FIG. 2 are stored, as software (e.g., the program 140 of FIG. 1), in the memory 230 in the form of instructions is shown as an example. The instructions may be loaded by the at least one processor 220 to execute operations of the functional modules.

Various embodiments are not limited thereto, and the functional modules related to updating an application may be driven as a part of the processor 220 and/or implemented as a separate hardware configuration operated independently from the processor 220.

Referring to FIG. 2, the functional modules included in the memory 230 may include a store manager 231, a store database 232, a package parser 233, a package manager 234, a setting database (DB) 235, and/or store apps 236. Some of the described-above functional modules may be omitted or replaced, or may be integrated with at least one other module. The setting DB 235 and the store DB 232 are hereinafter described as separate DBs, but the embodiments are not limited thereto, and the same physical DB may be used depending on implementation.

According to an embodiment of the disclosure, a client structure, such as the store apps 236 installed in the electronic device 200 and a server, such as the first app store 301 or the second app store 302 for distributing applications of a developer may be operated.

According to an embodiment of the disclosure, the store apps 236 may receive (or download) an application installation file or an application package (e.g., *.apk, Android package kit file) from the first app store 301 or the second app store 302 through the communication module 210.

According to an embodiment of the disclosure, an application (e.g., an Android application) may be developed in a specific programming language (e.g., Java language). The application installation file or application package is a file required to install or update an application, and may include a code (classes.dex), a resource (library and resource) (e.g., a Java source code, layout xml file, image file, audio file, animation, menu, style, and/or color), and/or a signature key for authentication, and may be compressed in a zip archive format and generated as an application package file (e.g., an extension "apk" file). For example, one apk file represents one application (or app) and may be a file installed in the electronic device 200.

According to an embodiment of the disclosure, the package manager 234 may install, delete, and/or update an application.

According to an embodiment of the disclosure, the package manager 234 may perform an application installation operation when an application installation file is downloaded to the electronic device 200. When the installation of the application is completed, the package manager 234 may store information on the corresponding application in the setting DB 235.

According to an embodiment of the disclosure, the setting DB 235 may store information on an application installed in the electronic device 200. The application information stored in the setting DB 235 may include, for example, a package name of the application, certificate information, and information on a subject (app store) having installed the application.

According to an embodiment of the disclosure, when an application package (e.g., an update file related to an application to be updated) is received by the electronic device 200 for an application update, the package manager 234 may perform a validity check and verification of the received application package (e.g., an update file related to an application to be updated).

According to an embodiment of the disclosure, when the verification of the application is completed, the package manager 234 may generate a new profile to be used for compilation by parsing an executable file (e.g., dex information) from an application package (e.g., a downloaded application package) related to an application to be updated, through the package parser 233. According to an embodiment of the disclosure, the package manager 234 may perform compilation, based on a new profile, to generate files, such as a *.oat file (or native file) and *.art (or an initialization image) and generate an application data directory, based the generated files. According to an embodiment of the disclosure, the package manager 234 may delete a previous application installation file (e.g., an .apk file) when the installation of the application is completed.

According to an embodiment of the disclosure, the process of automatically updating an application installed in the electronic device 200 by using a specific app store is performed by the corresponding specific app store as a subject, and an app store which performs such an application update may be referred to as the source of the corresponding application. Source information on an application is configured when the corresponding application is installed in the electronic device 200, and an app store which has installed the corresponding application may be an app store which updates the corresponding application, that is, the source of the corresponding application. For example, when a specific application is installed using the first app store 301, the first app store 301 may be the source of the specific application.

According to an embodiment of the disclosure, the store manager 231 may generally control an update on an application installed in the electronic device 200.

According to an embodiment of the disclosure, the store manager 231 may detect various events in which source information on an application installed in the electronic device 200 is changed.

According to an embodiment of the disclosure, the store manager 231 may detect a source information change event by receiving source change information of an application, the source of which is desired to be changed, from a source change target app store (e.g., the second app store 302) through the store apps 236.

According to an embodiment of the disclosure, the store manager 231 may detect a source change event by receiving source change information through a development specification file (e.g., Android Manifest) included in an android package kit (APK) parsed by the package parser 233 during an installation process of the APK received through an app store (e.g., the first app store 301) which is a current source of the specific application.

According to an embodiment of the disclosure, when occurrence of a situation in which the source of an app store performing an update on an application installed in the electronic device 200 is changed according to occurrence of various events is detected, the store manager 231 may cause an application to be updated by the changed app store, based on the detection.

According to an embodiment of the disclosure, when a situation in which the source of an app store performing an update is changed occurs, the store manager 231 may provide an API to the store apps 236 so as to notify that a specific application installed in the electronic device 200 is a source change target application.

According to an embodiment of the disclosure, when an app store change situation with respect to a specific application installed in the electronic device 200 occurs, the store manager 231 may store, in the store DB 232, app store change information notifying an app store change together with information on the specific application. The store apps 236 may identify a source change target application through the information stored in the store DB 232.

According to an embodiment of the disclosure, the store DB 232 may store a package name of a source change target application, information on a source change target app store, version information, and/or certificate information. The store apps 236 may receive an application package with respect to the source change target application through the source change target app store, based on the information stored in the store DB 232. For example, the store apps 236 may identify a name of the source change target app store and/or the source change target application, based on the package name and/or the certificate information stored in the store DB 232. For example, the store apps 236 may compare the version information stored in the store DB 232 with actual version information of the source change target application, and proceed to change the source when the stored version of the source change target application is a version later than the version of the currently installed application.

Table 1 below may indicate an example of source change information stored in the store DB 232.

TABLE 1

| Source change target (package name) | Source changeable version | Certificate (certificate unique value) |
|---|---|---|
| com.android.samsungpay | 1.2.3 | 3b16c6270c973e60d6add360009f049b4f7 ddbadf7a60c7f120a906b46ad1cfe |
| com.android.samsungpass | 12.24 | ea37a1c4d03dcb33abdae9f8097 30573c65195a0cd49c9b1e8e2715448adb8 |

TABLE 1-continued

| Source change target (package name) | Source changeable version | Certificate (certificate unique value) |
|---|---|---|
| | | 02 |

In the above example, a source change target package name may include information on a source change target application and information on a source change target app store. For example, the source change target package name may indicate a name of the source change target application, which is used in the source change target app store. According to an embodiment of the disclosure, the store apps 236 may identify that a specific application installed in the electronic device 200 is a source change target application through the store manager 231, identify whether a higher version of the source change target application exists in a source change target app store (e.g., the second app store 302), and notify the store manager 231 that the higher version application exists when the higher version exists.

According to an embodiment of the disclosure, the store manager 231 may induce user consent through various notifications, such as a push notification or a pop-up notification, and when a user consents, change the source of the corresponding application through the package manager 234.

According to an embodiment of the disclosure, the package manager 234 may use the store apps 236 to receive an application package from an app store (e.g., the second app store 302) which is a changed source, and perform an update by parsing the received application package through the package parser 233.

According to an embodiment of the disclosure, when the application update according to the source change of the app store is completed, the package manager 234 may update the setting DB 235 by using information on the changed app store with respect to the updated application.

According to an embodiment of the disclosure, when the update according to the source change of the app store with respect to the application is completed, the store manager 231 may delete, from the store DB 232, app store source change information notifying the source change of the app store together with information on the updated application.

FIG. 3 is a diagram illustrating an operation 300 of an electronic device for performing an application update according to an embodiment of the disclosure.

Referring to FIG. 3, according to an embodiment of the disclosure, a first application (e.g., Samsung Pay) installed in the electronic device 200 may be an application installed by an installation file received from the first app store 301 through a first store app 201.

According to an embodiment of the disclosure, a second application (e.g., Samsung Note) installed in the electronic device 200 may be an application installed by an installation file received from the second app store 302 through a second store app 202.

According to an embodiment of the disclosure, source information of the first application and the second application may be stored in a setting DB (e.g., the setting DB 235 of FIG. 2). For example, the source information of the first application may include the first app store 301 which is an installation subject of the first application. For example, the source information of the second application may include the second app store 302 which is an installation subject of the second application.

According to an embodiment of the disclosure, a store manager (e.g., the store manager 231 of FIG. 2) of the electronic device 200 may detect various events in which source information on an application installed in the electronic device 200 is changed.

According to an embodiment of the disclosure, the store manager 231 may detect a source information change event by receiving source change information of an application, the source of which is desired to be changed, from a source change target app store (e.g., the second app store 302) through the second store app 202 (e.g., one of the store apps 236 of FIG. 2).

According to an embodiment of the disclosure, the store manager 231 may detect a source change event by obtaining source change information through a development specification file (e.g., Android Manifest) included in an APK parsed by the package parser 233 during an installation process of the APK received through an app store (e.g., the first app store 301) which is a current source of a specific application.

According to an embodiment of the disclosure, when a source app store change event for the first application (e.g., Samsung Pay) installed in the electronic device 200 occurs, the store manager 231 may store, in a store DB (e.g., the store DB 232 of FIG. 2), app store change information notifying a change of the app store together with information on the first application.

According to an embodiment of the disclosure, the store DB 232 may store a package name of a source change target application, information on a source change target app store, version information, and/or certificate information. For example, the app store change information stored in the store DB 232 may include a name of the second app store 302 with respect to the first application which is a source change target application.

According to an embodiment of the disclosure, the first store app 201 and the second store app 202 may periodically identify the store DB 232, and identify a source change target application through the stored information.

According to an embodiment of the disclosure, the second store app 202 may identify the source change target application and/or a name of the source change target app store, based on the package name and/or the certificate information stored in the store DB 232. For example, the second store app 202 may identify that the source of the app store for the first application (e.g., Samsung Pay) is changed to itself, based on the information stored in the store DB 232.

According to an embodiment of the disclosure, when it is identified that the source of the app store of the first application is changed to itself, the second store app may identify a current version of the first application, and identify whether a higher version of the first application exists, through the second app store 301.

According to an embodiment of the disclosure, when the higher version of the first application exists in the second app store 302, the second store app 202 may notify the store manager 231 that the higher version application exists.

According to an embodiment of the disclosure, the store manager 231 may induce user consent through various notifications, such as a push notification or a pop-up notification, and when a user consents, perform an update by changing the source of the first application through the package manager 234.

According to an embodiment of the disclosure, the package manager 234 may cause an application package to be received through the second store app 202, and perform an update based on the received application package.

According to an embodiment of the disclosure, when the update of the first application is completed, the package manager 234 may update the setting DB 235 by using information on the second app store which is a changed source of the first application.

According to an embodiment of the disclosure, when the update according to the source change of the app store with respect to the application is completed, the store manager 231 may delete, from the store DB 232, app store source change information notifying the source change of the app store together with information on the updated application.

According to various embodiments of the disclosure, an electronic device (e.g., the electronic device 200 of FIG. 2) may include a communication module (e.g., the communication module 210 of FIG. 2), a memory (e.g., the memory 230 of FIG. 2), and a processor (e.g., the processor 220 of FIG. 2) operatively connected with the communication module and the memory, wherein the memory stores instructions which, when executed, cause the processor to, based on application information of a specific application installed in the electronic device, receive app store source change information for updating the specific application, identify whether a higher version of the specific application exists in an app store which is to update the specific application, the app store being identified based on the app store source change information relating to the specific application, and update the specific application by receiving an application package of the higher version from the identified app store.

According to various embodiments of the disclosure, the memory may store instructions that, when executed, cause the processor to receive the app store source change information through the identified app store of the specific application.

According to various embodiments of the disclosure, the memory may store instructions that, when executed, cause the processor to obtain the app store source change information from a file received from the identified app store, and store the app store source change information in a store database through a store manager.

According to various embodiments of the disclosure, the memory may store instructions that, when executed, cause the processor to identify a current source of the specific application through the store manager, and store the app store source change information in the store database when the current source is different from the app store identified based on the app store source change information.

According to various embodiments of the disclosure, the memory may store instructions that, when executed, cause the processor to identify the app store source change information stored in the store database through a store app corresponding to the identified app store, and receive the application package of the specific application from the identified app store.

According to various embodiments of the disclosure, the memory may store instructions that, when executed, cause the processor to, when the updating of the specific application is completed, delete the app store source change information from the store database through the store manager.

According to various embodiments of the disclosure, the memory may store instructions that, when executed, cause the processor to receive the app store source change information through an app store which is a current source of the specific application.

According to various embodiments of the disclosure, the memory may store instructions that, when executed, cause the processor to receive another application package of the specific application from the app store which is the current source, and obtain the app store source change information from a file included in the other application package.

According to various embodiments of the disclosure, the memory may store instructions that, when executed, cause the processor to store the app store source change information in a store database through a store manager, identify the app store source change information stored in the store database through a store app corresponding to the identified app store, and receive the application package of the higher version from the identified app store, based on the app store source change information.

According to various embodiments of the disclosure, the memory may store instructions that, when executed, cause the processor to, when a plurality of store apps are identified based on the app store source change information through the store manager, identify an app store corresponding to a store app installed in the electronic device according to a priority among the plurality of store apps as the app store which is to update the specific application.

According to various embodiments of the disclosure, when a version of a developer application installed in the electronic device is greater than the version of the application in the file, the at least one processor may determine the application as a source change target application.

Figure 4:
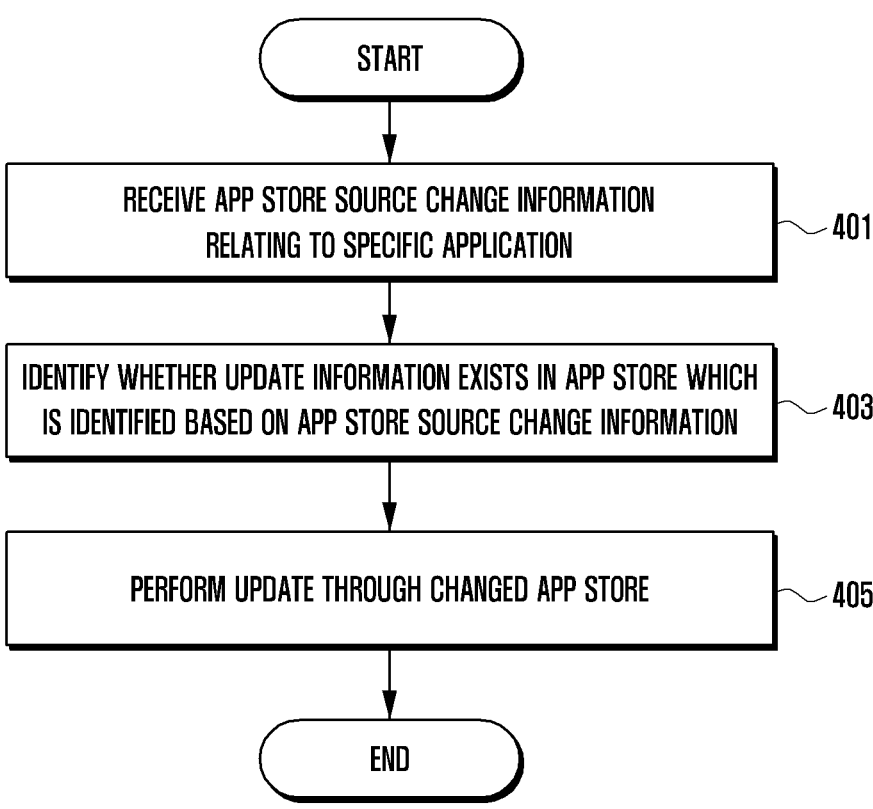
FIG. 4 is a flowchart illustrating an operation of an electronic device for performing an application update according to an embodiment of the disclosure.

FIG. 4 is a diagram illustrating an operation of an electronic device for performing an application update according to an embodiment of the disclosure.

Referring to FIG. 4, according to an embodiment of the disclosure, a processor (e.g., the processor 220 of FIG. 2) of the electronic device 200 may be configured to perform operations of loading instructions stored in a memory (e.g., the memory 230 of FIG. 2) to change and update the sources of various applications installed in the electronic device 200.

According to an embodiment of the disclosure, in operation 401, the processor 220 may receive app store source change information relating to a specific application installed in the electronic device 200. For example, the processor 220 may receive the app store source change information relating to the specific application through a source change target app store which is to perform an update according to a source change, based on application information of the specific application. For example, the processor 220 may install the specific application, based on application information of the specific application, or receive the app store source change information of the specific application through a current source app store which is recently updated.

According to an embodiment of the disclosure, in operation 403, the processor 220 may identify an app store which performs an update on the specific application, based on the app store source change information relating to the specific application, and identify whether a higher version of the specific application exists through the identified app store.

According to an embodiment of the disclosure, the processor 220 may obtain a package name of the specific application, information on a source change target app store, version information, and/or certificate information through the app store source change information.

According to an embodiment of the disclosure, when the higher version of the specific application exists in the identified app store, in operation 405, the processor 220 may receive an application package of the higher version through the identified app store to perform an update.

Figure 5:
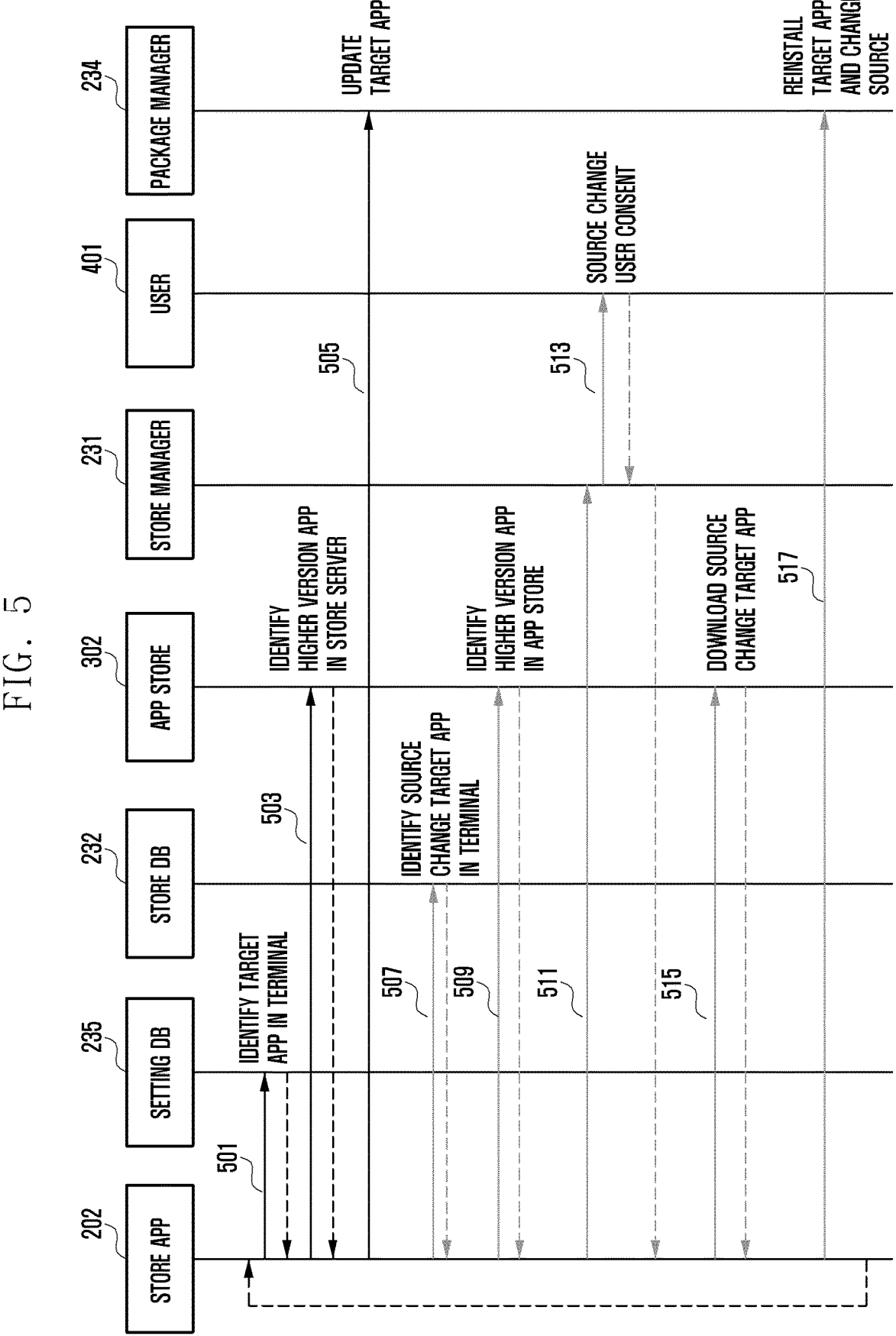
FIG. 5 is a flowchart of signal processing between a server and functional modules of an electronic device for performing an application update according to an embodiment of the disclosure.

FIG. 5 is a flowchart of signal processing between a server and functional modules of an electronic device for performing an application update according to an embodiment of the disclosure.

Referring to FIG. 5, according to an embodiment of the disclosure, in operation 501, a store app (e.g., the second store app 202 of FIG. 3) may identify an application installed in the electronic device 200 by the second store app 202 through a setting DB (e.g., the setting DB 235 of FIG. 2).

According to an embodiment of the disclosure, in operation 503, the store app 202 may identify whether a higher version of a target application exists in a corresponding app store (e.g., the second app store 302).

According to an embodiment of the disclosure, when the higher version of the target application exists, the second store app 202 may download an application package of the higher version from the second app store 302, and request an update of the target application from the package manager 234 to perform an update in operation 505.

In operation 507, the second store app 202 may identify a target application, the source of which is desired to be changed to the second app store 302, through app store source change information stored in a store DB (e.g., the store DB 232 of FIG. 2).

According to an embodiment of the disclosure, when the target application is stored in the electronic device 200, in operation 509, the second store app 202 may identify whether the higher version of the target application exists in the second app store 302.

According to an embodiment of the disclosure, the second store app 202 may be implemented so that the electronic device 200 can search for an application to be updated in the background when connected to Wi-Fi, during a time when the electronic device 200 is likely to be unused (e.g., after midnight), and/or while charging, but embodiments are not limited thereto. For example, the second store app 202 may be implemented to periodically perform operation 507 of identifying the store DB 232, and accordingly, periodically perform operation 509 of identifying the existence of the higher version through the second app store 302.

According to an embodiment of the disclosure, when the higher version of the target application exists in the second app store 302, in operation 511, the second store app 202 may transmit version information of the application package of the higher version of the target application to the electronic device 200 (e.g., the store manager 231) to notify that the higher version exists.

According to an embodiment of the disclosure, the store manager 231 may request a user's consent with respect to a change in the source of the app store in operation 513. For example, the store manager 231 may provide a user notification for notifying that the higher version of the target application installed in the electronic device 200 exists in the second app store 302, and inducing an update.

According to an embodiment of the disclosure, when the user consents to change the source of the app store, the second store app 202 may download the application package of the target application from the second app store 302 in operation 515.

According to an embodiment of the disclosure, the second store app 202 may be implemented to download the application package before requesting the user' consent. However, even in this case, the user's consent may be required at a time point of performing an application update according to the downloaded application package.

According to an embodiment of the disclosure, in operation 517, the second store app 202 may update the target application through the package manager 234 and change the source thereof, based on the downloaded application package. For example, when the update of the target application is performed, the package manager 234 may update the source of the target application stored in the setting DB 235 to the second app store 302, and complete the source change.

Figure 6:
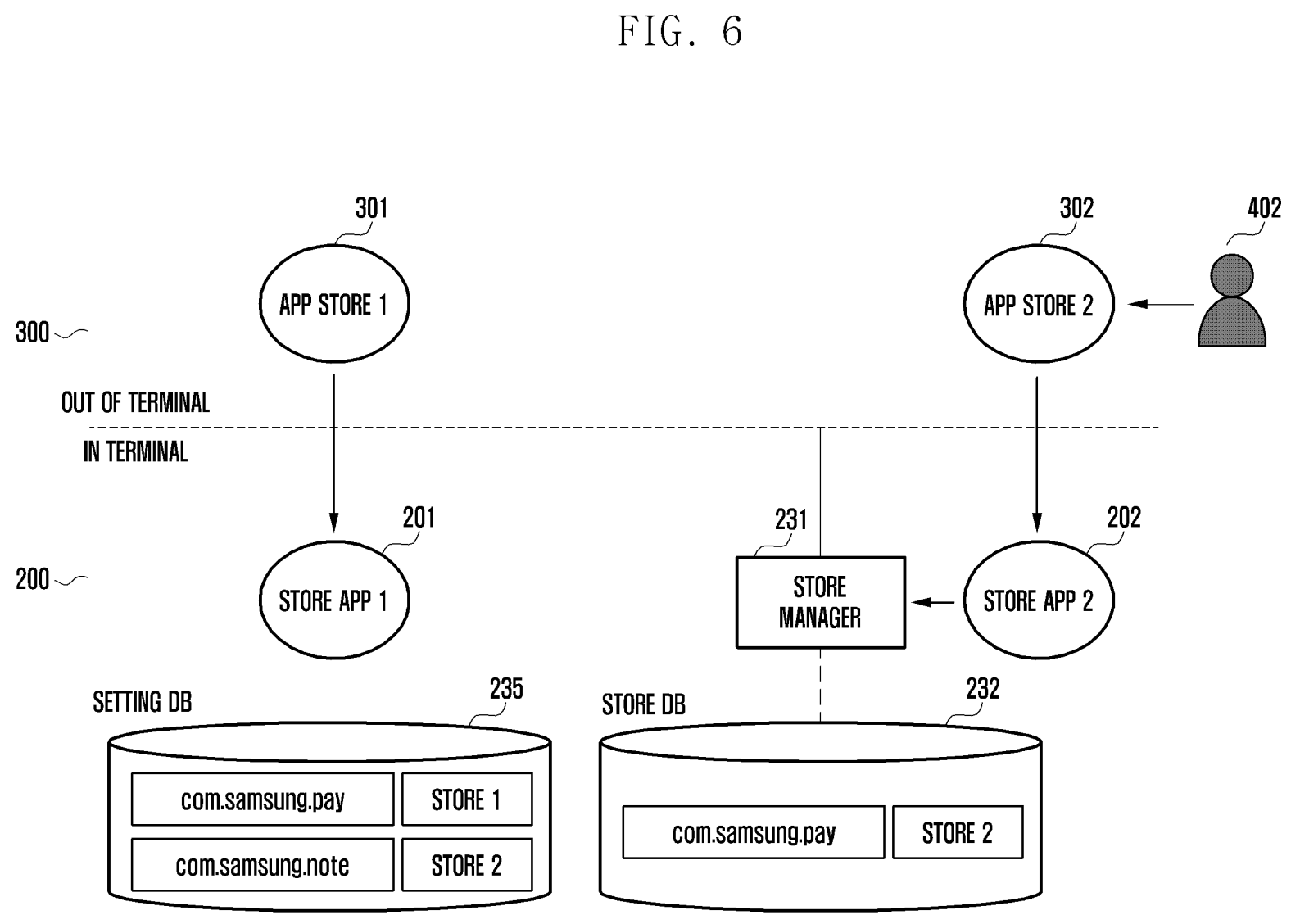

FIG. 6 is a diagram illustrating an operation of an electronic device for performing an application update according to an embodiment of the disclosure.

Referring to FIG. 6 according to an embodiment of the disclosure, app store source change information may be processed using the first store app 301 or the second store app 302 (e.g., the store apps 236 of FIG. 2).

According to an embodiment of the disclosure, the app store source change information may be processed through an app store (e.g., the first app store 301 or the second app store 302 of FIG. 2) and the second store app 302 of the electronic device 200.

Hereinafter, an example of changing the source of a specific application (e.g., Samsung Pay) installed by the first app store 301 to the second app store 302 will be described.

According to an embodiment of the disclosure, it is noted that the specific application (e.g., Samsung Pay) has been installed through the first app store 301, and referring to the setting DB 235, the source of the specific application (e.g., Samsung Pay) has been stored as the first app store 301.

According to an embodiment of the disclosure, information (e.g., app store change information) of an application, the source of which is desired to be changed by a user 402 to a specific store (e.g., the second app store 302) may be transmitted to the electronic device 200 through a corresponding store app (e.g., the second store app 202) from a specific app store (e.g., the second app store 302) which is a changed source.

According to an embodiment of the disclosure, app store change information relating to the specific application, transmitted to the electronic device 200 through a store app (e.g., the second store app 202), may be stored in a store DB (e.g., the store DB 232 of FIG. 2) through a store manager (e.g., the store manager 231 of FIG. 2).

According to an embodiment of the disclosure, for example, source change information of the specific application may be provided to the electronic device 200 through the second store app 202 from the second app store 302 in the form of a file (e.g., a specification file) in which the intention to change the source is specified.

FIG. 7 illustrates a specification file for changing an app store source according to an embodiment of the disclosure.

Referring to FIG. 7, a specification file including app store change information may include information on an application range (e.g., country/operator/OS version) in a specific field (e.g., a COUNTRY, CARRIERS, and VERSION field). For example, a specification file uploaded by a developer to an app store may be classified and/or integrated based on the application range, and may be transmitted from the app store to a store app based on the classification and/or integration. Each application may have a different function for each country/operator/OS version depending on the circumstances of a development company. In this case, the size of data transmitted from the app store to the electronic device 200 may be minimized through the application range.

According to an embodiment of the disclosure, the specification file may include a package name (e.g., a SOURCE field) of the store app. According to an embodiment of the disclosure, the app store may store and manage the specification file, based on the package name of the store app. According to an embodiment of the disclosure, the store manager 231 may use the package name of the store app as a key value with respect to the specification file transmitted to the electronic device 200, and register the same in the store DB 232.

According to an embodiment of the disclosure, the specification file may include a package name, version information, and/or certificate information (e.g., a PACKAGE field) of an application. According to an embodiment of the disclosure, the specification file is a file written for the purpose of changing the source of a specific application, and the electronic device 200 may use a package name, version information, and/or certificate information of an individual application to specify a target application to which a source change is applied. Among the above-described information, the package name may be unique information of an application but may be impersonated, and thus certificate information may be required. For example, when package names of applications are the same and certificate information included in an actual application package and certificate information of an application in a specification file are the same, the applications may be determined as applications created by the same developer. The version information is information on the version of an application to which a developer desires to change the source, and when the version of the developer application installed in the electronic device 200 is greater than the version of the application in the specification file, the application may be determined as a source change target application.

According to an embodiment of the disclosure, the specification file may include a digital signature (e.g., a SIGNATURE field) for the included application information. In this case, a private key, which is used, may be a private key used when generating a corresponding application. The digital signature included in the specification file may be used to determine that the package name, version information, and/or certificate information included in the specification file is written by an actual developer. Before storing source change information of a specific application in the store DB 232 based on the specification file, for example, the digital signature included in the specification file may be authenticated by extracting certificate information from an application package of the corresponding application. When the digital signature is normally authenticated, it may be determined that a developer's private key used at the time of generating the application package has been used for the digital signature, and thus the specification file can be trusted.

In an example of the specification file of FIG. 7, a <CONFIG> area may designate an application range and prevent unnecessary file transmission. <SOURCE> in the <CONFIG> area may indicate a package name of a new store application to which the source of a target application is desired to be changed. An <APPLICATION> area may include information on an application, the source of which is desired to be changed, and may include, for example, a plurality of application package names. When the plurality of application package names are included, certificate information (e.g., certificate HASH), application version information, and/or digital signature information may be included for each application package name. Authentication and integrity verification may be performed in an app store (e.g., the second app store 302) and the electronic device 200 by using such information.

Figure 8:
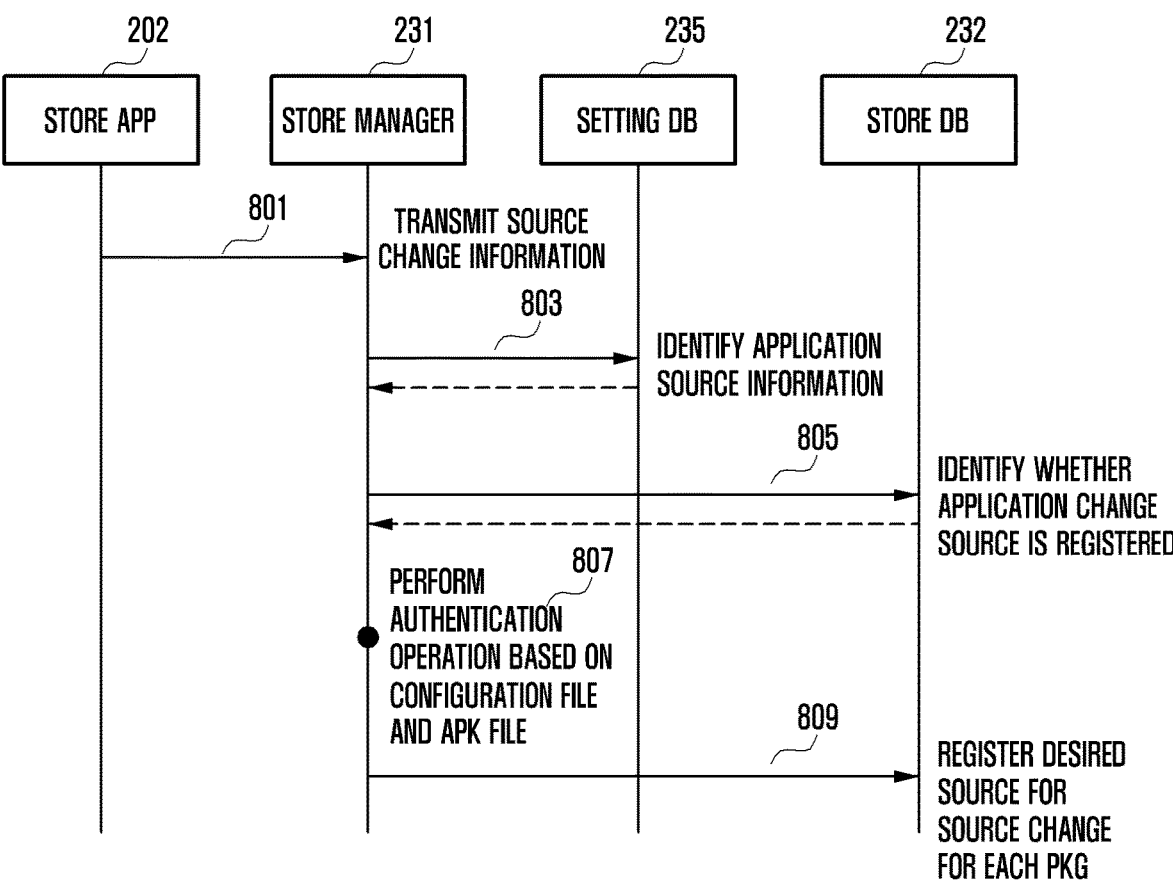
FIG. 8 is a flowchart of signal processing between a server and functional modules of an electronic device for performing an application update according to an embodiment of the disclosure.

FIG. 8 is a flowchart of signal processing between a server and functional modules of an electronic device for performing an application update according to an embodiment of the disclosure.

Referring to FIG. 8, app store source change information of a specific application according to an embodiment may be received from the app store 302 through a store app (e.g., the second store app 202 of FIG. 2) in the form of, for example, a specification file, and transmitted to a store manager (e.g., the store manager 231 of FIG. 2) of the electronic device 200 in operation 801. Accordingly, the store manager 231 may update the specific application to the store DB 232 as a list of source change-desired applications through a series of authentication processes.

According to an embodiment of the disclosure, in operation 803, the store manager 231 may identify whether the specific application has been installed in the electronic device 200, through the setting DB 235, based on a package name included in the specification file, and identify source information of the application. For example, a source change intention for the specific application may be identified by comparing source change information included in the specification file with source information stored in the setting DB 235.

According to an embodiment of the disclosure, in operation 805, the store manager 231 may identify whether a target source for a source change of the specific application has been registered in the store DB 232, based on the source information of the specific application.

According to an embodiment of the disclosure, when the target source for a source change of the specific application has been registered, in operation 807, the store manager 231 may compare certificate information stored for each package name from an application configuration file in the setting DB 235 with certificate information written for each package name included in a specification file of an application package, so as to identify whether the pieces of certificate information match, and perform an authentication operation. Since a package name is a value generated by a developer and duplication may occur, for example, the authentication operation may be performed by comparing certificate hashes.

According to an embodiment of the disclosure, the store manager 231 may refer to the store DB 232, and when source change information relating to the specific application has not been registered, register source change information relating to a package name of the specific application in the store DB 232. In this case, specification file information may be authenticated based on a digital signature included in the specification file, and a package name of the store app included in the specification file may be configured as a key value of the store DB 232 and registered.

According to an embodiment of the disclosure, the store manager 231 may identify a target application and whether a source change of the application is required, and then register application information in the store DB 232 by using the name of the store app as a key value. Accordingly, the store app may obtain a list of source change-desired applications from the store DB 232 by using its own package name as a key value of the store DB 232.

FIG. 9 is a diagram illustrating an operation of an electronic device for performing an application update according to an embodiment of the disclosure.

Referring to FIG. 9, according to an embodiment of the disclosure, the electronic device 200 may identify application source change information by using a specification file (e.g., android manifest) included in an application package.

According to an embodiment of the disclosure, a desired source for a source change of an application may be specified as source change information in the specification file of a developer included in the application package.

According to an embodiment of the disclosure, the application package may be transmitted when a source change target application is installed in the electronic device 200 or updated, and after the source change target application is installed or updated, the source change information may be transmitted to a store manager (e.g., the store manager 234 of FIG. 2) through a package manager (e.g., the package manager 234 of FIG. 2), so that a store DB (e.g., the store DB 232 of FIG. 2) may be updated. In an application installation process, when the intention to change an application installation source is identified by referring to the specification file included in the application package, the package manager 234 may register the source change information in the store DB 232 when a store app to which the source is desired to be changed exists in the electronic device 200.

Referring to FIG. 6, a source change operation may be performed by identifying whether a target application is installed in the electronic device 200 according to source change information included in a received specification file. However, referring to FIG. 9, a source change operation may be performed by identifying whether a store app, which is a desired source for a source change, has been installed in the electronic device 200, based on the specification file included in the application package. When a store app to which a developer desires to change the source does not exist in the electronic device 200, an app store of the corresponding application cannot be changed.

According to an embodiment of the disclosure, a plurality of store apps to which the source is desired to be changed may be specified in the specification file of the application package. Accordingly, the electronic device 200 may register a store app installed in the electronic device 200 among the plurality of specified store apps as a desired source for a source change.

According to an embodiment of the disclosure, store apps (e.g., the store apps 236 of FIG. 2) may periodically refer to the store DB 232 to obtain a list of applications which desires to change their sources to an app store managed by themselves in the electronic device 200. In this case, the store apps 236 may identify a package name, version information, and/or certificate information of a source change-desired application by referring to the store DB 232 through a standard API by using their own package names as key values.

According to an embodiment of the disclosure, when attempting to change the source of an app store to provide the latest updated version of a specific application to the electronic device 200, the source change information may be specified in the specification file included in the application package with respect to the specific application, and the source change information may be transmitted to the electronic device 200 while the corresponding specific application is installed in the electronic device 200 or updated.

According to an embodiment of the disclosure, an application package including a specification file in which a developer's intention to change the source of an app store for an application is specified may be installed in the electronic device 200.

According to an embodiment of the disclosure, in the process of registering the source change information based on the specification file included in the application package, for example, a process of authenticating a digital signature according to a package name may be omitted. A signature is made by a developer's private key when the application package is generated, and in the process of being installed in the electronic device 200, a process of identifying integrity and authentication of all files of the application package may be performed. Therefore, additional authentication of the specification file included in the application package may be omitted.

As an example of the specification file as described above, an android manifest file is a development specification file defined in an Android application package, and may be used by specifying a unique name (package name), permission, version, and custom format of an application that the developer desires to use in the application.

According to an embodiment of the disclosure, as the source change information, a target store tag may be defined in the specification file. For example, the target store tag may specify a B, C, and D store as examples of a custom format. Accordingly, during the application installation process, the store manager 231 may identify whether store apps to which the source is desired to be changed exist in the electronic device 200 according to a priority, and store an existing store app in the store DB 232 as a desired source for a source change of an installation application. In this case, when a store app which actually installs the installation application is the same as a desired source for a source change of an application included in the specification file, the source change information may not be stored in the store DB 232 by determining that that there is no need to change the source.

Figure 10:
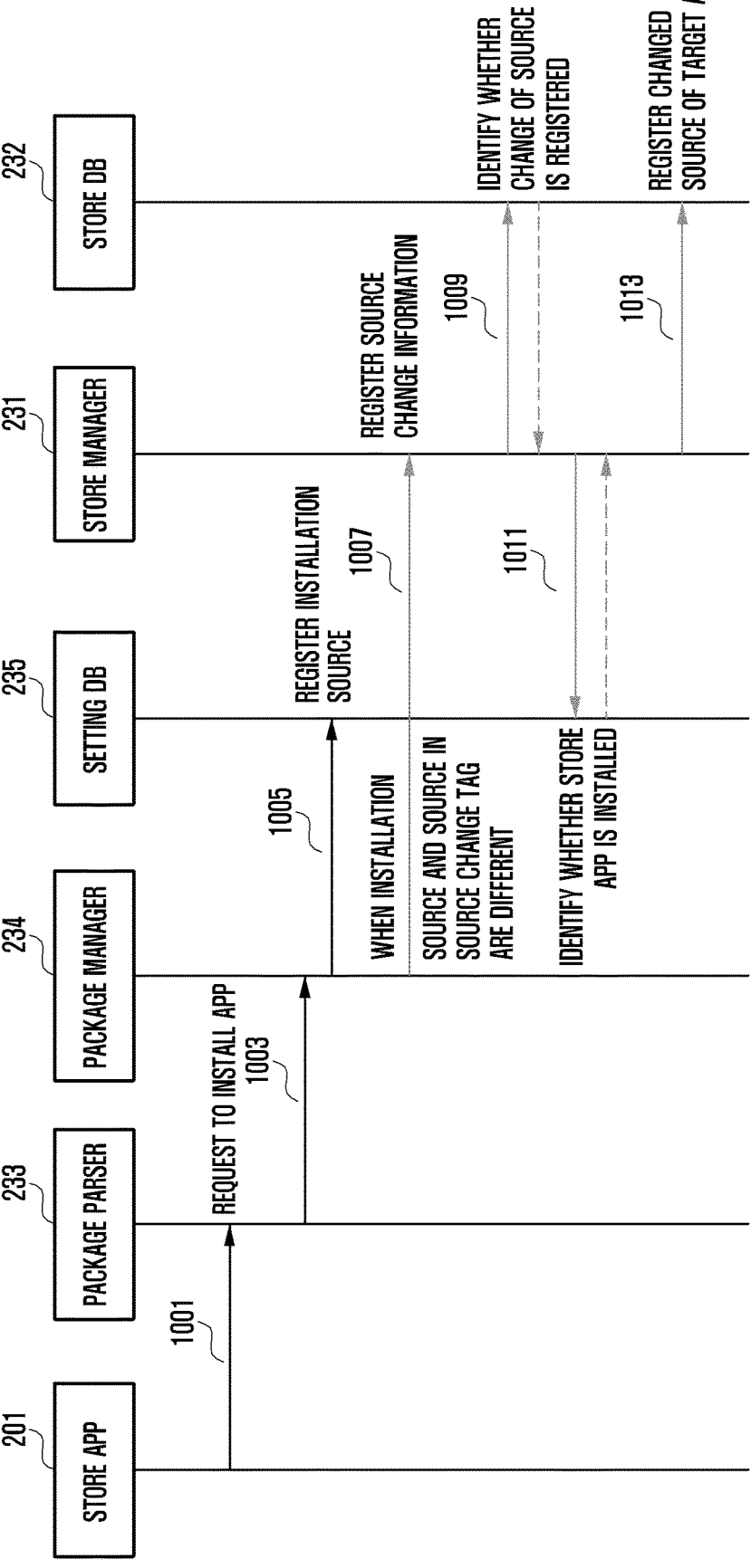
FIG. 10 is a flowchart of signal processing between a server and functional modules of an electronic device for performing an application update according to an embodiment of the disclosure.

FIG. 10 is a flowchart of signal processing between a server and functional modules of an electronic device for performing an application update according to an embodiment of the disclosure.

Referring to FIG. 10, in operation 1001, an application package downloaded from the first app store 301 through a store app (e.g., the first store app 201 of FIG. 2) for an installation or update of a specific application may be transmitted to the package parser 233 to allow the application to be installed. The package parser 233 may parse an executable file, and request a package manager (e.g., the package manager 234 of FIG. 2) to install the application, in operation 1003, based on the parsed executable file.

According to an embodiment of the disclosure, in operation 1005, the package manager 234 may store an installation source (e.g., the first app store 301) of the parsed application package in the setting DB 235.

According to an embodiment of the disclosure, in operation 1007, the package manager 234 may identify source change information (e.g., a desired source for a source change included in a source change tag) included in a development specification file (e.g., Android Manifest) included in the application package, and request a store manager (e.g., the store manager 231 of FIG. 2) to register the source change information when the installation source and a desired source for a source change are different.

According to an embodiment of the disclosure, in operation 1009, the store manager 231 may identify whether the requested source change information has been registered in the store DB 232.

According to an embodiment of the disclosure, in operation 1011, when the requested source change information has not been registered in the store DB 232, the store manager 231 may identify, through the setting DB 235, whether a target application has been installed through a store app to which the source is desired to be changed.

According to an embodiment of the disclosure, in operation 1013, the store manager 231 may register source change information relating to the target application in the store DB 232 when the target application is not installed through the store app to which the source is desired to be changed. The source change information relating to the target application may include, for example, a package name of the target application, version information, authentication information, and/or information on the store app to which the source is desired to be changed.

In various embodiments of the disclosure, the store app transmission manner described with reference to FIG. 6 may request a source change of multiple applications, and may proceed with a source change without updating a target application. For example, when a specific app store no longer supports an application update, the manner may be used to change the source of the app store to another store.

In various embodiments of the disclosure, in relation to the application package transmission manner of FIG. 9, since a source change is performed when an application is installed or updated, a developer authentication process of a target application and an operation of specifying an application range of a configuration file may be omitted. In addition, since a desired store app for a source change may be specified for each priority, the manner may be performed regardless of whether a specific store app exists in the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication module;
memory, comprising one or more storage media, storing instructions and a setting database including information on a source of an application installed on the electronic device; and
at least one processor operatively connected with the communication module and the memory,
wherein the instructions, when executed by the at least one processor individually or collectively, cause the electronic device to:
based on detecting an event for changing an app store of an application installed on the electronic device, identify app store source change information with respect to the application, the app store source change information including information on a target app store with respect to the application and version information for updating the application,
compare the source of the application stored in the setting database with the information on the target app store in the app store source change information,
when the source of the application stored in the setting database is different from the target app store in the app store source change information, update the application by receiving an update file for the application from the target app store, and update the setting database by changing the source of the application stored in the setting database to the target app store in the app store source change information.

2. The electronic device of claim 1, wherein the instructions, when executed by the at least one processor individually or collectively, further cause the electronic device to receive the app store source change information through the target app store in the app store source change information.

3. The electronic device of claim 2, wherein the instructions, when executed by the at least one processor individually or collectively, further cause the electronic device to:
obtain the app store source change information from a file received from the target app store in the app store source change information; and
store the app store source change information in a store database through a store manager.

4. The electronic device of claim 3, wherein the instructions, when executed by the at least one processor individually or collectively, further cause the electronic device to:
identify the source of the application stored in the setting database through the store manager; and
store the app store source change information in the store database in case that the source of the application stored in the setting database is different from the target app store in the app store source change information.

5. The electronic device of claim 3, wherein the instructions, when executed by the at least one processor individually or collectively, further cause the electronic device to:
identify the app store source change information stored in the store database through a store app corresponding to the target app store in the app store source change information; and
receive the update file of the application from the target app store in the app store source change information.

6. The electronic device of claim 3, wherein the instructions, when executed by the at least one processor individually or collectively, further cause the electronic device to, in case that the updating of the application is completed, delete the app store source change information from the store database through the store manager.

7. The electronic device of claim 1, wherein the instructions, when executed by the at least one processor individually or collectively, further cause the electronic device to receive the app store source change information through an app store which is the source of the application stored in the setting database.

8. The electronic device of claim 7, wherein the instructions, when executed by the at least one processor individually or collectively, further cause the electronic device to:
receive another update file of the application from the target app store in the app store source change information; and
obtain the app store source change information from a file included in the other update file.

9. The electronic device of claim 8, wherein the instructions, when executed by the at least one processor individually or collectively, further cause the electronic device to:
store the app store source change information in a store database through a store manager;
identify the app store source change information stored in the store database through a store app corresponding to the target app store in the app store source change information; and
receive the update file of the higher version from the target app store in the app store source change information.

10. The electronic device of claim 9, wherein the instructions, when executed by the at least one processor individually or collectively, further cause the electronic device to, in case that a plurality of store apps are identified based on the app store source change information through the store manager, identify an app store corresponding to a store app installed in the electronic device according to a priority among the plurality of store apps as the app store which is to update the application.

11. A method of an electronic device, the method comprising:

based on the detecting an event for changing an app store of an application installed on the electronic device, identifying app store source change information with respect to the application, the app store source change information including information on a target app store with respect to the application and version information for updating the application;

comparing the source of the application stored in a setting database with the information on the target app store in the app store source change information;

when the source of the application stored in the setting database is different from the target app store in the app store source change information, updating the application by receiving an update file for the application from the target app store; and updating the setting database by changing the source of the application stored in the setting database to the target app store in the app store source change information.

12. The method of claim 11, wherein the receiving of the app store source change information comprises receiving the app store source change information through the target app store in the app store source change information.

13. The method of claim 12, further comprising:

obtaining the app store source change information from a file received from the target app store in the app store source change information; and storing the app store source change information in a store database through a store manager.

14. The method of claim 13, further comprising:

identifying the source of the application stored in the setting database through the store manager, wherein the storing of the app store source change information comprises storing the app store source change information in the store database in case that the source of the application stored in the setting database is different from the target app store in the app store source change information.

15. The method of claim 13, further comprising:

identifying the app store source change information stored in the store database through a store app corresponding to the target app store in the app store source change information; and receiving the update file of the application from the target app store in the app store source change information.

16. The method of claim 13, further comprising:

in case that the updating of the application is completed, deleting the app store source change information from the store database through the store manager.

17. The method of claim 11, wherein the receiving of the app store source change information comprises receiving the app store source change information through an app store which is the source of the application stored in the setting database.

18. The method of claim 17, further comprising:

receiving another update file of the application from the target app store in the app store source change information; and obtaining the app store source change information from a file included in the other update file.

19. The method of claim 18, further comprising:

storing the app store source change information in a store database through a store manager;

identifying the app store source change information stored in the store database through a store app corresponding to the target app store in the app store source change information; and receiving the update file of the higher version from the target app store in the app store source change information.

20. The method of claim 19, wherein the identifying of the app store comprises, in case that a plurality of store apps are identified based on the app store source change information through the store manager, identifying an app store corresponding to a store app installed in the electronic device according to a priority among the plurality of store apps as the app store which is to update the application.

* * * * *